(12) United States Patent
Benz et al.

(10) Patent No.: US 8,590,690 B2
(45) Date of Patent: Nov. 26, 2013

(54) DEVICE FOR TAKING OVER, TEMPORARILY STORING AND PASSING ON ELONGATED, HOLLOW CYLINDRICAL PRODUCT UNITS AND A METHOD FOR THE OPERATION OF SUCH A DEVICE

(75) Inventors: Gottlieb Benz, Flums (CH); Albertus Robbertson, Veenendaal (NL)

(73) Assignees: Texal AG, Haldenstein (CH); Boxal Netherlands BV, Veenendaal (NL)

( * ) Notice: Subject to any disclaimer, the term of this patent is extended or adjusted under 35 U.S.C. 154(b) by 969 days.

(21) Appl. No.: 12/628,828

(22) Filed: Dec. 1, 2009

(65) Prior Publication Data

US 2010/0138041 A1 Jun. 3, 2010

(30) Foreign Application Priority Data

Dec. 1, 2008 (CH) ........................ 1881/08
Jul. 3, 2009 (EP) ..................... 09164553

(51) Int. Cl.
*B65G 1/00* (2006.01)
(52) U.S. Cl.
USPC ...................... 198/347.4; 198/418.6; 198/426; 414/331.1; 414/331.04; 700/218
(58) Field of Classification Search
USPC ................. 198/347.04, 575, 577, 418.6, 426; 414/331.04, 331.1; 700/218
See application file for complete search history.

(56) References Cited

U.S. PATENT DOCUMENTS

| | | | |
|---|---|---|---|
| 3,184,032 A * | 5/1965 | Ingemar Jonsson John Petter | 198/463.4 |
| 4,316,754 A * | 2/1982 | Hinchcliffe et al. | 414/414 |
| 4,712,964 A * | 12/1987 | van Elten et al. | 414/281 |
| 4,964,498 A * | 10/1990 | Klingl | 198/347.1 |
| 5,735,380 A * | 4/1998 | Schneider et al. | 198/347.1 |
| 5,826,693 A * | 10/1998 | Andersen | 198/347.1 |
| 5,903,464 A * | 5/1999 | Stingel et al. | 700/215 |
| 6,170,634 B1 * | 1/2001 | Jaquet | 198/347.1 |

(Continued)

FOREIGN PATENT DOCUMENTS

| | | |
|---|---|---|
| DE | 20 2004 008 678 U1 | 9/2004 |
| GB | 1 177 942 A | 1/1970 |
| GB | 2 203 404 A | 10/1988 |
| JP | 11-309406 | 11/1999 |

OTHER PUBLICATIONS

Gottlieb Benz et al., "European Search Report," EP Patent Application No. 09 16 4553, filed Jul. 3, 2009 (Feb. 1, 2012).

*Primary Examiner* — Joseph Dillon, Jr.
(74) *Attorney, Agent, or Firm* — Janet Sleath; Speckman Law Group PLLC

(57) ABSTRACT

A device for taking over, temporarily storing and passing on elongated, hollow-cylindrical product units, preferably tubes, sleeves or cans, which come from a production line, has a first supplying conveyor belt and a continuously delivering second conveyor belt. The first and the second conveyor belts are disposed horizontally lying one above the other in a transfer zone. An intermediate storage arrangement is designed as a high-rack storage arrangement or as a paternoster storage arrangement. At least one handling robot is also located in the region of the transfer zone between the conveyor belts and the intermediate storage arrangement. This handling robot is designed either (a) to take a number of product units from the first conveyor belt and to feed them to the second conveyor belt or the intermediate storage arrangement, or (b) to remove a number of product units from the intermediate storage arrangement and to feed them to the second conveyor belt.

14 Claims, 7 Drawing Sheets

(56) References Cited

U.S. PATENT DOCUMENTS

| | | | |
|---|---|---|---|
| 6,945,380 B2 * | 9/2005 | Sauer | 198/339.1 |
| 7,073,657 B2 * | 7/2006 | Langenegger et al. | 198/460.1 |
| 7,210,889 B2 * | 5/2007 | McFarland | 414/331.02 |
| 7,686,153 B2 * | 3/2010 | Tsai | 198/347.1 |
| 8,276,739 B2 * | 10/2012 | Bastian et al. | 198/347.1 |
| 2004/0050657 A1 * | 3/2004 | Langenegger et al. | 198/347.1 |
| 2004/0149541 A1 * | 8/2004 | Sauer | 198/347.2 |
| 2008/0213080 A1 * | 9/2008 | Cachelin et al. | 414/791.6 |
| 2010/0080673 A1 * | 4/2010 | von der Waydbrink et al. | 414/222.01 |
| 2010/0114362 A1 * | 5/2010 | Zumbrunn et al. | 700/218 |
| 2012/0186192 A1 * | 7/2012 | Toebes et al. | 53/235 |
| 2012/0195720 A1 * | 8/2012 | Sullivan et al. | 414/277 |

\* cited by examiner

DEVICE FOR TAKING OVER, TEMPORARILY STORING AND PASSING ON ELONGATED, HOLLOW CYLINDRICAL PRODUCT UNITS AND A METHOD FOR THE OPERATION OF SUCH A DEVICE

REFERENCE TO RELATED APPLICATIONS

This application claims priority to Swiss patent application no. CH 01881/08 filed Dec. 1, 2008 and European patent application no. EP 09164553.1 filed Jul. 3, 2009.

FIELD OF THE INVENTION

The invention relates to a device for taking over, temporarily storing and passing on elongated, hollow-cylindrical product units and a method for the operation of such a device.

The invention relates in particular to a device and a method for taking over, temporarily storing and passing on tubes, sleeves, cans or similar product units, which come from a production line and which are processed or further worked on at a downstream workstation. The device according to the invention is therefore also referred to in abbreviated form as "intermediate storage device" in the following.

Essential components of such an intermediate storage device are, amongst other things:
- a supplying conveyor arrangement in the form of a first conveyor belt,
- a continuously delivering conveyor arrangement in the form of a second conveyor belt, the first and the second conveyor belt being disposed horizontally lying one above the other in a transfer zone, and
- an intermediate storage arrangement which is disposed in the transfer zone.

BACKGROUND OF THE INVENTION

The purpose of such an intermediate storage device basically consists in the fact that product units arranged beside one another in a row are at all times made available without gaps to a continuously delivering conveyor arrangement—which for its part feeds, for example, a following processing or packaging unit with product units to be processed. In the case of excesses in the supply, the product units can be diverted temporarily into the intermediate storage arrangement and, in the case of gaps in the supply, product units can be removed from the intermediate storage arrangement.

Intermediate storage functions are of particular importance in production lines. It is also a matter of ensuring, for example, the removal of product units from the upstream production units when a stoppage occurs in a downstream processing or packaging unit, in order that production as a whole does not have to be stopped. Such downtimes occur not only in the event of mishandling operations or defects, but in some cases are also quite regular, e.g. when there is a change-over from one size or shape of product units or packaging units to another size or shape. This may require various further adaptations, such as for example carriers, grippers or spikes for engaging product units in various stations of a production line. If, on the other hand, a station upstream in the production line is stopped, the downstream stations can be temporarily fed from the intermediate storage arrangement. It is also often the case that the individual stations may be operated in a controlled manner at different speeds in order to fill or empty the existing intermediate storage arrangement.

EP-1 114 784 shows a device for taking over elongated, at least approximately cylindrical product units, in particular tubes, sleeves or cans, which are coming continuously from a production line. The device is used to form product groups with a preselectable number of units. It comprises a continuously supplying conveyor unit and a conveyor belt with product receptacles which takes up the product groups and conveys them into a diverting position. The conveyor unit and the conveyor belt also comprise a common transfer section in which they run spaced apart parallel to one another. In the region of the transfer section, a size-variable depositing area is disposed between the conveyor unit and the conveyor belt, said depositing area being able to be moved depending on the product groups to be formed. The size-variable depositing area is designed as a flexible belt section, which in a restricted sense can be regarded as an intermediate storage function. An essential drawback with this device, however, is that the available intermediate storage capacity is very small, because the main purpose of this device lies not in the intermediate storage, but in the formation of product groups.

Intermediate storage devices or compensators with a larger accommodation capacity are also known. They are usually devices with meandering chains, to which gondola-like shells are attached which can accommodate the product units. An example of such a compensator is described in EP-0 438 974.

SUMMARY OF THE INVENTION

It is the object of the invention to provide an improved intermediate storage device and a method for its operation.

This problem is solved by providing a device for taking over, temporarily storing and passing on elongated, hollow-cylindrical product units, preferably tubes, sleeves or cans, which come from a production line, the device comprising a supplying conveyor arrangement in the form of a first conveyor belt, and a continuously delivering conveyor arrangement in the form of a second conveyor belt, wherein the first and the second conveyor belt are disposed horizontally lying one above the other in a transfer zone, and an intermediate storage arrangement is disposed in the transfer zone. The intermediate storage arrangement is a high-rack storage arrangement or a paternoster storage arrangement. At least one handling robot is disposed in the region of the transfer zone between the conveyor arrangements and the high-rack storage arrangement, and the handling robot is designed either (a) to take a number of product units from the first conveyor belt and feed them to the second conveyor belt or the intermediate storage arrangement, or (b) to remove a number of product units from the intermediate storage arrangement and feed them to the second conveyor belt.

The present invention also provides a method for the operation of a device for taking over, temporarily storing and passing on elongated, hollow-cylindrical product units, preferably tubes, sleeves or cans, which come from a production line, the device having a supplying conveyor arrangement in the form of a first conveyor belt, and a continuously delivering conveyor arrangement in the form of a second conveyor belt, wherein the first and the second conveyor belt are disposed horizontally lying one above the other in a transfer zone, an intermediate storage arrangement in the form of a high-rack storage arrangement or a paternoster storage arrangement is disposed in the transfer zone, and a handling robot is disposed in the region of the transfer zone between the conveyor arrangements and the high-rack storage arrangement. The handling robot either takes a number of product units from the first conveyor belt after adaptation of the position and speed to the first conveyor belt and thereafter feeds the product units removed from the first conveyor belt to the second conveyor belt after adaptation of the position and speed to the second conveyor belt, feeds the product units removed from the first conveyor belt to the intermediate storage arrangement, or feeds the product units removed from the intermediate storage arrangement to the second conveyor belt after adaptation of the position and speed to the second conveyor belt.

The improvements are achieved by the fact that a high-rack storage arrangement or a paternoster storage arrangement is provided as the intermediate storage arrangement and at least one handling robot is disposed in the region of the transfer zone between the conveyor arrangements and the intermediate storage arrangement. The handling robot is also designed either (a) to take a number of product units from the first conveyor belt and to feed them to the second conveyor belt or the intermediate storage arrangement, or (b) to remove a number of product units from the intermediate storage arrangement and to feed them to the second conveyor belt.

Because both the first and the second conveyor belt are usually in motion during these procedures, the method for the operation of such a device must make provision such that the handling robot can undertake an adaptation to the given conveyor belt both in terms of position as well as speed.

The advantages of such an arrangement and implementation lie first and foremost in the fact that the intermediate storage capacity is significantly increased and the space requirement in the line (production line or further processing line) is much smaller (shorter intermediate storage devices). Furthermore, standard solutions available in the trade for the corresponding basic components can be used both for the intermediate storage arrangement (high-rack storage arrangement or paternoster storage arrangement) as well as for the handling robot. Finally, excessive expenditure is therefore not required either with regard to mechanical or control-related adaptations in existing production lines.

Suitable high-rack storage systems are, for example, the lean-lift and high-rack systems from the firm Hänel, which operate with a computer-controlled positioning lift and with which existing headroom can be very well utilized. Suitable paternoster storage arrangements are offered for example by the firm Texa. These are paternoster storage arrangements with container guides, which prevent rocking of the storage containers when the paternoster is started and stopped.

Suitable handling robots are offered for example by the firms ABB and Fanuc.

Since the device is provided for the handling of elongated, hollow-cylindrical product units, engaging spikes offer a possibility for straightforward, reliable engagement and transport. Complicated gripping and holding devices can thus be dispensed with. The quantity of product units that can be transported simultaneously can be controlled very well by the selection of a desired number of engaging spikes lying beside one another with equal spacing. In practice, the number of engaging spikes will be geared to the dimensioning of the storage containers of the high-rack storage arrangement.

The handling robot is provided with the possibility of linear movements at least in the X-, Y- and Z-direction and, depending on the design, also the possibility of a swiveling movement about the axis lying parallel to the conveying direction of the conveyor belts. The latter enables a compact design of the intermediate storage device, because the conveyor belts and the storage arrangements can then stand closer beside one another. This can be advantageous for installation in existing production lines.

As mentioned, either high-rack storage arrangements or paternoster storage arrangements can be used as the storage arrangements. A suitable choice can be made here depending on the situation and the requirements. Various options also arise with regard to the disposition of the storage arrangements relative to the two conveyor belts one lying above the other. Thus, for example, solutions with high-rack storage arrangements are possible, wherein the handling robot does not need to perform swiveling movements.

In the case of high-rack storage arrangements, provision can also be made for the storage containers of the high-rack storage arrangement to be designed swiveling. The swivel ability of the storage containers is intended on the one hand to achieve an easy filling/removal capability and on the other hand reliable transport and storage inside the intermediate storage arrangement.

For the purpose of filling or removal, the storage containers are swiveled into a position slightly inclined with respect to the vertical. This enables reliable filling, because the filled longitudinal, hollow-cylindrical product units cannot then slip so easily on account of this inclination.

Paternoster storage arrangements, on the other hand, correspond more to the standard and previously known solutions for intermediate storage arrangements with larger storage capacities. They have the drawback that whole chains of storage containers and, consequently, large masses always have to be put into motion, but on the other hand they also have the advantage that a large number of storage containers can be repositioned simultaneously in a relatively straightforward manner. Since the employed intermediate storage arrangements have to cope with ever greater throughput rates of product units per unit of time, it is of increasing importance that whole groups of product units can be brought into the intermediate storage arrangement or removed from the intermediate storage arrangement simultaneously and very quickly. This is of course facilitated if empty or full storage containers are already available or are constantly being made available nearby. Paternoster solutions, especially those with more than one paternoster unit, are advantageous in such circumstances.

Since both the storage arrangements and the handling robot are in principle bought-in parts (to be modified), their control devices have to be suitably connected together and connected to the control devices for the conveyor belts. In principle, this takes place in a manner known to the person skilled in the art, but separate or combined control devices can be provided for the various components. Thus, each or individual ones of the components could be processor-controlled by itself, and a common and higher-order control device could also be provided.

The intended design of the control system for the intermediate storage device makes provision such that only linear movements of the handling robot are required at least for a belt-to-belt displacement of product units. Such movements can be readily controlled and can be performed rapidly and efficiently. Great efficiency is achieved with a large number of engaging spikes arranged beside one another with equal spacing. The engagement with the engaging spikes is moreover a technology already tried and tested in practice.

Displacements of product units from the belt to the intermediate storage arrangement and from the intermediate storage arrangement to the belt can, depending on the design solution to be provided, comprise both linear movements and swiveling movements of the handling robot. In the case of solutions with a swiveling movement, the latter advantageously takes place about an axis running parallel to the conveying direction of the first and the second conveyor belt. The swiveling movement then takes place through an angle of approximately 180° and it is interrupted by a linear movement. The interruption of the swiveling movement preferably takes place with at least approximately vertically mounted engaging spikes, because then rapid linear movements can be carried out without there being the risk of product units slipping from the engaging spikes.

BRIEF DESCRIPTION OF THE DRAWINGS

The invention is explained in greater detail below with the aid of the figures in which.

DETAILED DESCRIPTION

Figure 1:
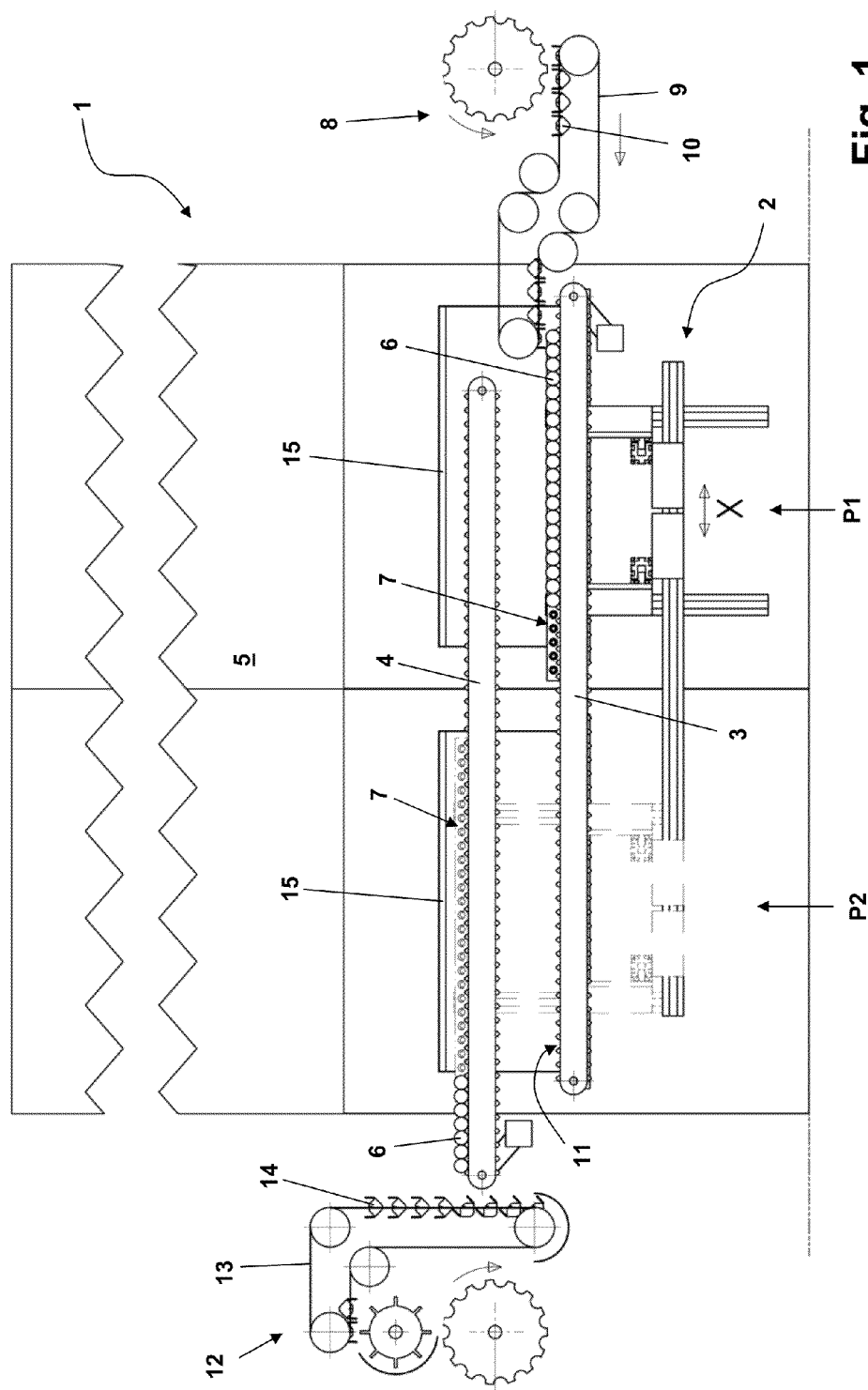
FIG. 1 shows a front view of a first embodiment of an intermediate storage device with a high-rack storage arrangement with a schematic representation of two different positions of the handling robot.

FIG. 1 shows a front view of an intermediate storage device 1 according to the invention with a schematic representation of two different positions P1, P2 of a handling robot 2. Intermediate storage device 1 has a supplying conveyor arrangement in the form of a first conveyor belt 3 and a continuously delivering conveyor arrangement in the form of a second conveyor belt 4. First and second conveyor belts 3, 4 are disposed horizontally one above the other in a transfer zone, and an intermediate storage arrangement and handling robot 2 are disposed in the transfer zone. The intermediate storage arrangement is designed as a high-rack storage arrangement 5.

Handling robot 2 is designed either (a) to take a number of longitudinal, hollow-cylindrical product units 6 from first conveyor belt 3 and feed them to second conveyor belt 4 or high-rack storage arrangement 5, or (b) to remove a number of product units 6 from high-rack storage arrangement 5 and feed them to second conveyor belt 4.

For the purpose of illustration, FIG. 1 represents schematically a first position P1, in which an engaging device 7 of handling robot 2 takes over a number of product units 6 from first conveyor belt 3. A second position P2 is also represented schematically by dashed lines, in which engaging device 7 of the handling robot passes on a number of product units 6 to second conveyor belt 4.

First conveyor belt 3 is fed with supplied product units 6 by a conveyor unit 8 with a circulating conveyor chain 9 and conveyor gondolas 10 mounted so as to be mobile in a swiveling manner on conveyor chain 9. Supplied product units 6 are deposited from these conveyor gondolas 10 into empty product receptacles 11 on first conveyor belt 3. The usually trough-shaped product receptacles 11 ensure that product units 6 always arrive equally spaced apart on first conveyor belt 3 and lie ready there for easy engagement.

A further conveyor unit 12 is fed by second conveyor belt 4 with continuously delivered product units 6. Here too, product units 6 again arrive in further conveyor gondolas 14 mounted so as to be mobile in a swiveling manner on a further conveyor chain 13. As mentioned, intermediate storage device 1 serves precisely to enable this continuous delivery. Continuous delivery is understood to mean that product units 6 arrive at further conveyor unit 12 interruption-free and gap-free. In the narrow sense, continuous delivery is also to be understood such that product units 6 arrive at further conveyor unit 12 in each case interruption-free and gap-free within preselectable units, so-called batches. In this sense, the device according to EP-1 114 784 could be replaced by the present intermediate storage device according to the invention.

Furthermore, it can be seen from FIG. 1 that handling robot 2 can be moved linearly in different directions, thus in the X-direction parallel to the conveying direction of first and second conveyor belt 3, 4. See below for further comments concerning the definition of the direction designations used here. Also indicated is the position and arrangement of storage containers 15 in high-rack storage arrangement 5.

Figure 2:
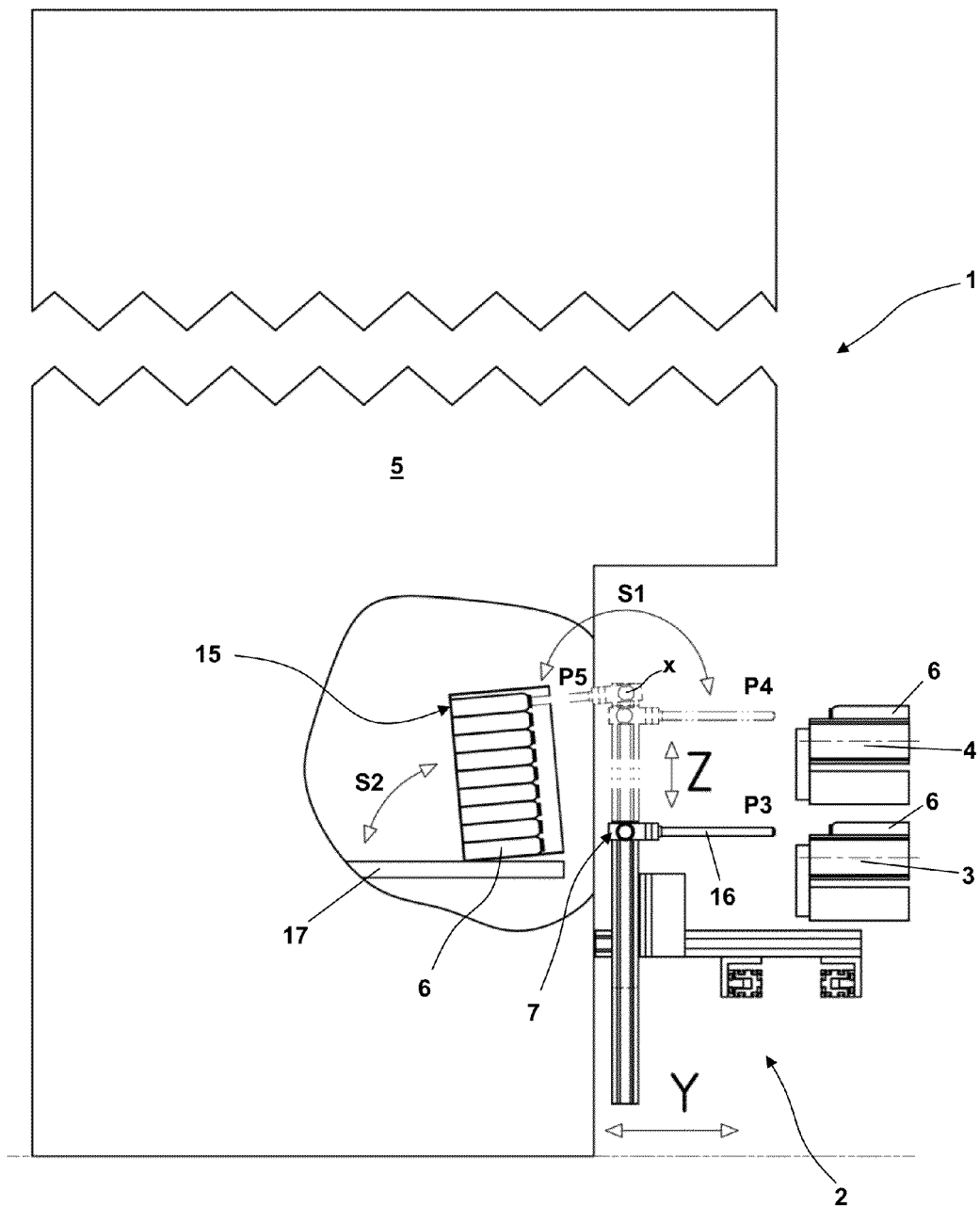
FIG. 2 shows the intermediate storage device of FIG. 1 in a side view with a schematic representation of three different positions of the handling robot.

FIG. 2 shows intermediate storage device 1 of FIG. 1 in a side view with a schematic representation of three different positions P3, P4, P5 of handling robot 2. Position P3 can correspond to position P1 (see FIG. 1) and position P4 can correspond to position P2 (see FIG. 1), i.e. positions in which either product units 6 are removed from first conveyor belt 3 or product units 6 are fed to second conveyor belt 4. Both can of course take place in the X-direction at an arbitrary point (within the movement range of the handling robot).

It can also be seen from FIG. 2 that handling robot 2 is disposed between conveyor belts 3, 4 and high-rack storage arrangement 5. Handling robot 2 also has the possibility of linear movements in the Y- and Z-direction. In addition, engaging device 7 of handling robot 2 can be swiveled about an x-axis which runs parallel to the X-direction. Possible swiveling motion 51, which amounts here to somewhat more than 180°, is indicated with a double arrow. Engaging device 7 is provided with a series of equally spaced engaging spikes 16 (see also FIG. 1 in this regard). The distances between the engaging spikes correspond to the distances between product receptacles 11 on first and second conveyor belt 3, 4. Engaging spikes 16 are dimensioned such that they can easily engage in the hollow spaces of elongated, hollow-cylindrical product units 6. Product units 6, as already mentioned above, are preferably tubes, sleeves or cans. Also indicated in FIG. 2 is a position P5 of handling robot 2. Engaging device 7 is swung round in position P5 and engaging spikes 16 point in the direction towards high-rack storage arrangement 5. A position in which product units 6 are just being removed from a storage container 15 or are just being fed to a storage container 15 is shown here. In order that, with the space conditions represented here, a transfer of product units 6 from and to the conveyor belts is in fact possible between conveyor belts 3, 4 and high-rack storage arrangement 5, handling robot 2 must also perform movements in the Y-direction. Since movements in the Y-direction are in any case provided and necessary for the transfer of product units 6 from first conveyor belt 3 to second conveyor belt 4, this freedom of movement can at the same time be used to achieve the particularly compact design of whole intermediate storage device 1 (see also brief description of operational sequence below).

In a high-rack storage arrangement 5, use is made of special swivelable storage containers 15 for product units 6, one of which is represented here schematically in the loading and unloading position. Storage container 15 is located in a drawer 17 of high-rack storage arrangement 5. Storage container 15 is a container open at one side, which is slightly inclined on one of its side faces in a first swiveling position (as represented) for the purpose of loading and unloading. In a second swiveling position, storage container 15 then stands on its base face for the purpose of storage and transport inside high-rack storage arrangement 5 (not represented). Possible swiveling movement S2 between the first and the second swiveling position is also denoted by a double arrow.

The following brief descriptions of operational sequences are restricted to the most important procedures and movements that occur, using the example of the first embodiment of the invention according to FIGS. 1 and 2.

The operational sequence for the removal of a number of product units 6 from first conveyor belt 3 and the feeding of these product units 6 to second conveyor belt 4 is essentially as follows:

- adaptation of the position and speed of engaging device 7 of the handling robot to first conveyor belt 3; especially to product units 6 lying on first conveyor belt 3 (see positions P1 and P3 in this regard),
- movement of engaging device 7 in the Y-direction with introduction of engaging spikes 16 into hollow spaces of hollow-cylindrical product units 6,
- movement of engaging device 7 in the Z-direction with slight raising of the now engaged product units,
- movement of engaging device 7 in the Y-direction for the purpose of removal from the region of the first conveyor belt,
- movement of engaging device 7 in the Z-direction for the purpose of displacement onto the level of second conveyor belt 4,
- adaptation of the position and speed of engaging device 7 of the handling robot to second conveyor belt 4; especially to product units 6 already lying on second conveyor belt 4 for the purpose of a gap-free arrangement in a row (see positions P2 and P4 in this regard),
- movement of engaging device 7 in the Y-direction to and above product receptacles 11 on second conveyor belt 4,
- movement of engaging device 7 in the Z-direction for the purpose of depositing the product units onto second conveyor belt 4, and
- movement of engaging device 7 in the Y-direction for the purpose of retracting engaging spikes 16 out of product units 6. Subsequently, making ready for a new operational sequence.

The operational sequence for the removal of a number of product units 6 from first conveyor belt 3 and the feeding of these product units 6 to high-rack storage arrangement 5 is essentially as follows:

- adaptation of the position and speed of engaging device 7 of the handling robot to first conveyor belt 3; especially to product units 6 lying on first conveyor belt 3 (see positions P1 and P3 in this regard),
- movement of engaging device 7 in the Y-direction with introduction of engaging spikes 16 into hollow spaces of hollow-cylindrical product units 6,
- movement of engaging device 7 in the Z-direction with slight raising of the now engaged product units,
- movement of engaging device 7 in the Y-direction for the purpose of removal from the region of the first conveyor belt,
- swiveling movement of engaging device 7 into a position in which engaging spikes 16 point essentially vertically upwards,
- movement of engaging device 7 in the Y-direction for the purpose of positioning handling robot 2 in a position which permits the loading of a storage container 15,
- swiveling movement of engaging device 7 into a position in which engaging spikes 16 point essentially in the direction of high-rack storage arrangement 5,
- positioning of the engaging device in the X- and Z-direction with respect to storage container 15 or to the (positions of) product units 6 already deposited in storage container 15,
- movement of engaging device 7 in the Y-direction to and above product units 6 already deposited in storage container 15 and subsequent depositing of product units 6 newly to be added (see position 5/FIG. 2 in this regard), and
- movement of engaging device 7 in the Y-direction for the purpose of retracting engaging spikes 16 out of product units 6. Subsequently, making ready for a new operational sequence.

The operational sequence for the removal of a number of product units 6 from high-rack storage arrangement 5 and the feeding of these product units 6 to second conveyor belt 4 naturally employs operational sequence steps as described above, but in part in the reverse order.

Figure 3:
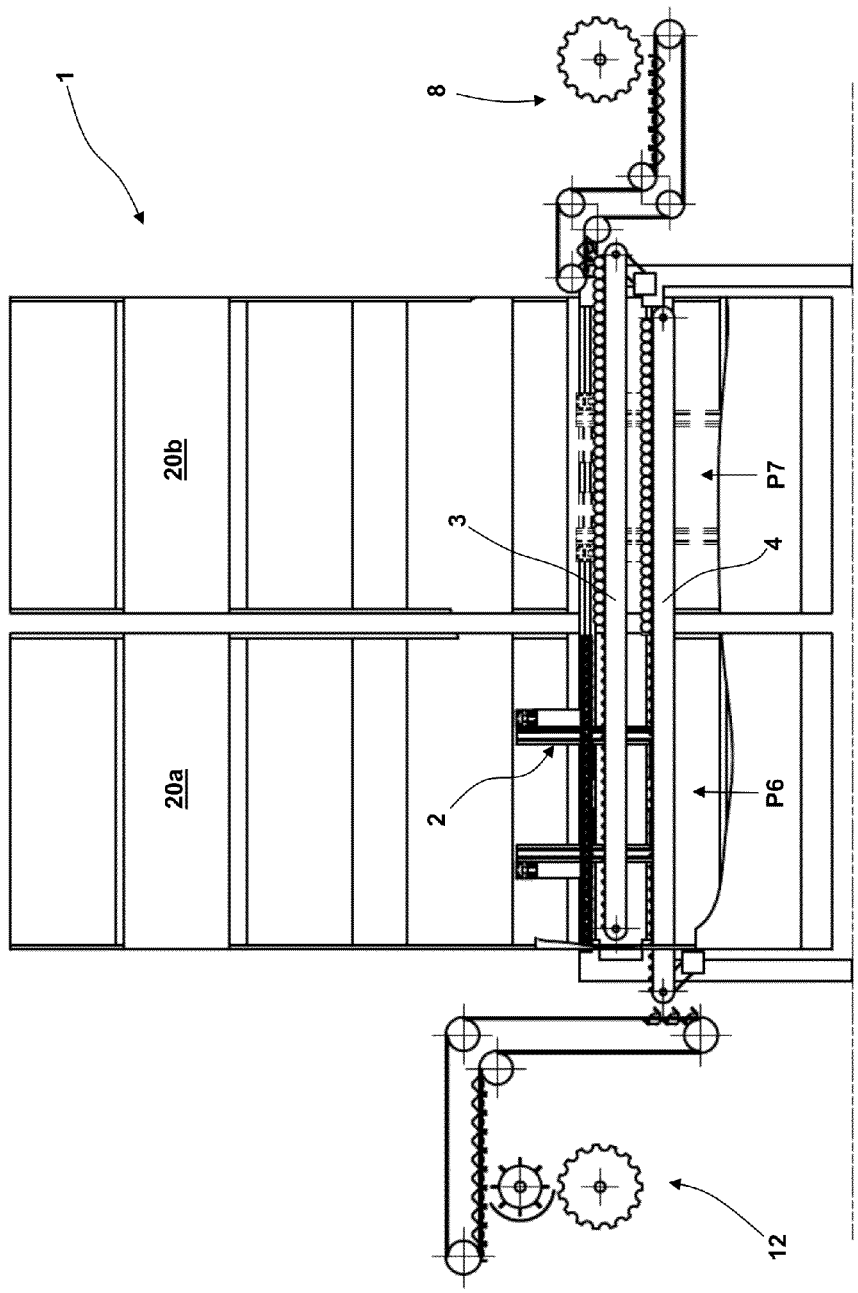
FIG. 3 shows a front view of a second embodiment of an intermediate storage device with a paternoster storage arrangement with a schematic representation of the handling robot.

FIG. 3 shows a front view of a second embodiment of intermediate storage device 1 with a paternoster storage arrangement with a schematic representation of handling robot 2. The representation largely corresponds to that of FIG. 1, although here first (supplying) conveyor belt 3 is disposed above second (delivering) conveyor belt 4. This is not however of importance for the basic function of the intermediate storage device. The paternoster storage arrangement comprises two paternoster units 20a, b standing beside one another. Two positions P6, P7 of handling robot 2 are also indicated here schematically, with P6 (unbroken lines) denoting the position of handling robot 2 when product units 6 are taken over from first conveyor belt 3 and P7 denoting the position of handling robot 2 when product units 6 are transferred to second conveyor belt 4.

Figure 4:
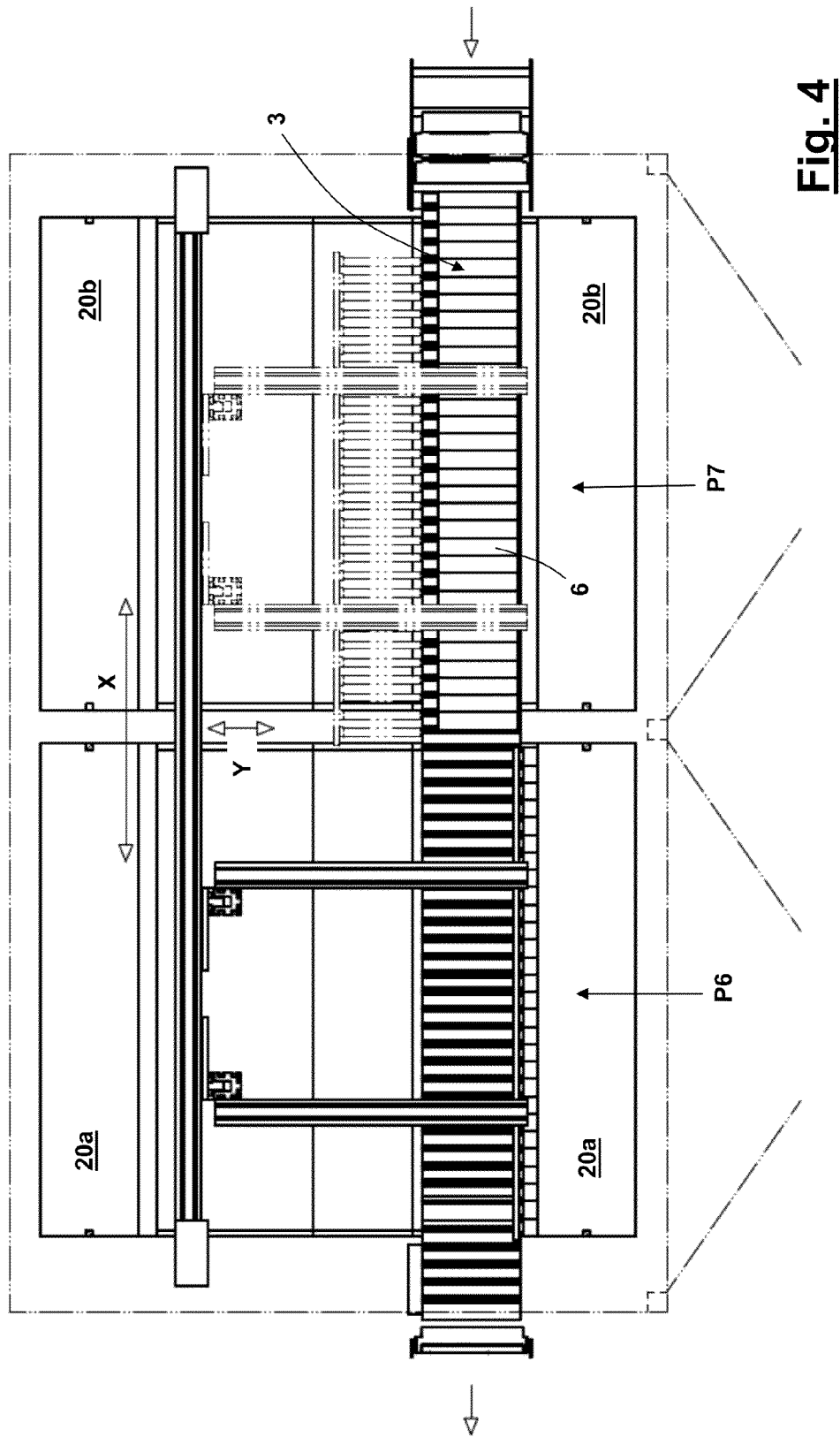
FIG. 4 shows the intermediate storage device of FIG. 3 in a view from above.

FIG. 4 shows the intermediate storage device of FIG. 3 in a view from above.

Figure 5:
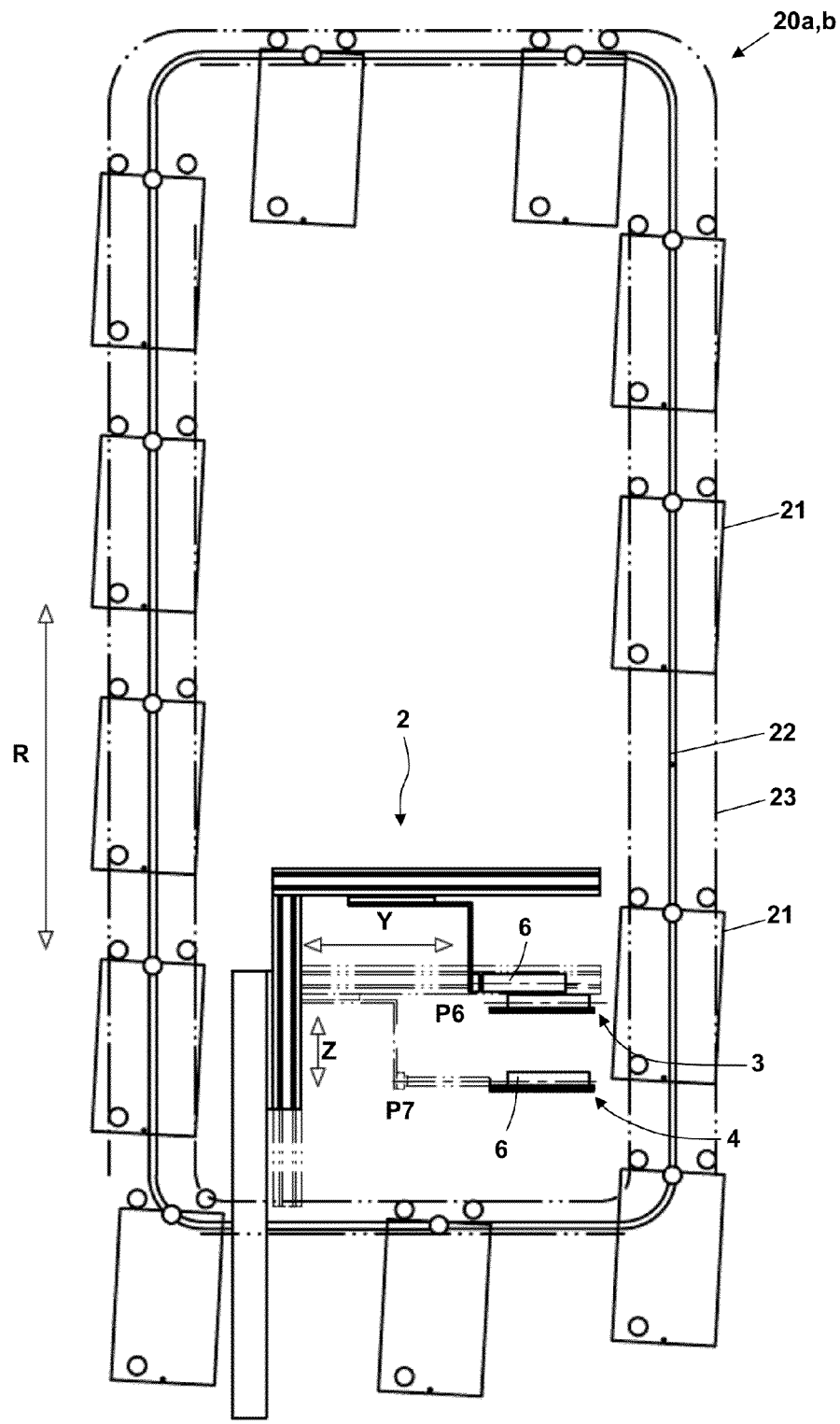
FIG. 5 shows the intermediate storage device of FIG. 3 in a side view with a schematic representation of two different positions of the handling robot.

FIG. 5 shows the intermediate storage device of FIGS. 3 and 4 in a side view with a schematic representation of two different positions P6 and P7 of handling robot 2. This figure is greatly simplified in order to clarify the main components. It can however clearly be seen here that handling robot 2 is located inside a paternoster loop. A number of paternoster storage containers 21, which can be put into motion simultaneously by means of a connection chain 22, run round in a selectable direction of rotation R and thus form the aforementioned paternoster loop. In this way, each individual paternoster storage container 21 can easily be brought, as required, into the vicinity or range of handling robot 2. Storage containers 21 are easily inclined, in order to ensure the reliable storage of product units 6 even during motion. Guides 23 are also provided in order to prevent swinging movements of storage containers 21 when the paternoster is started and stopped.

Figure 6:
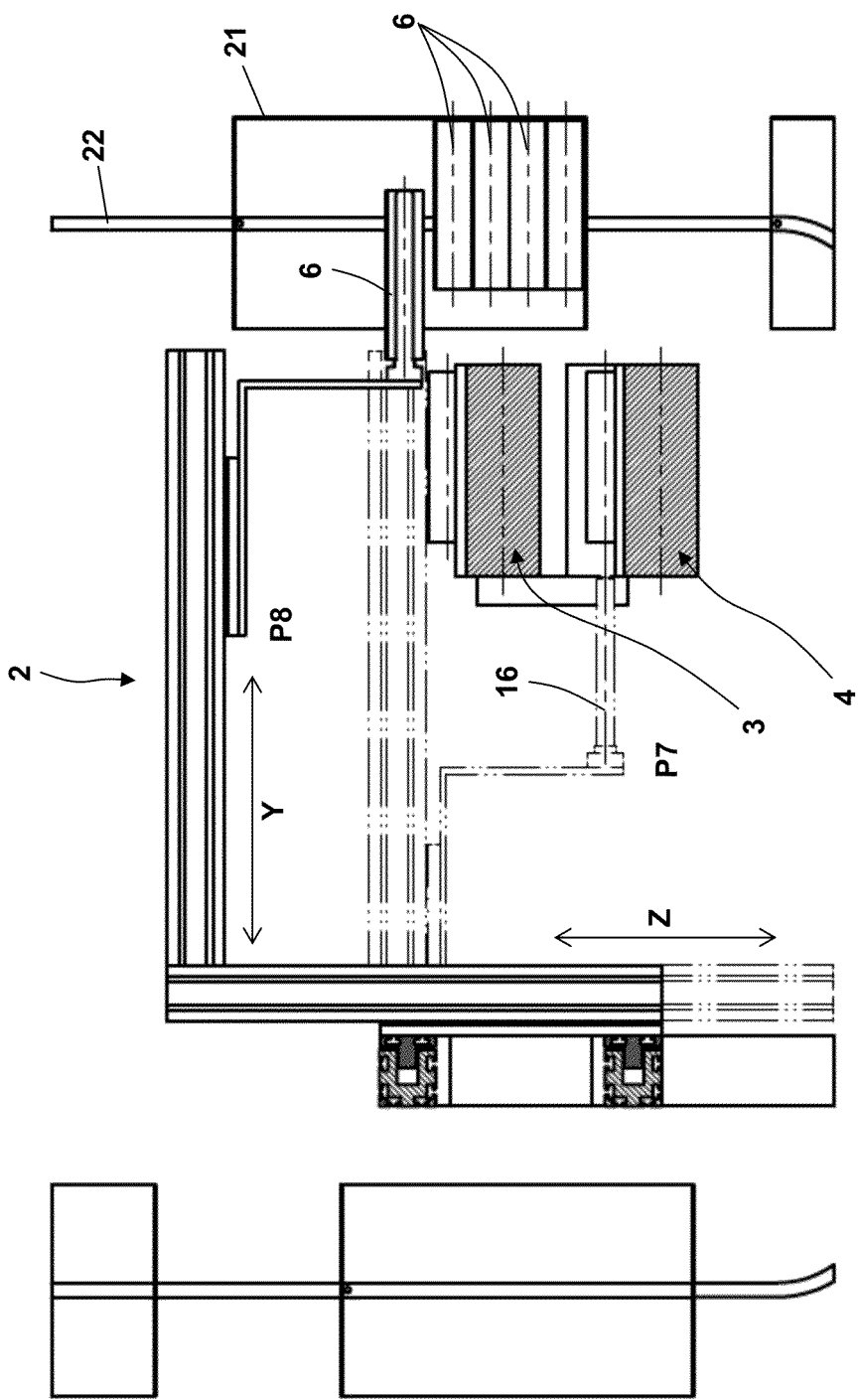
FIG. 6 shows an enlarged representation of two different positions of the handling robot.

For the purpose of further clarification, FIG. 6 also shows an enlarged representation of two different positions of handling robot 2. Two positions P7 and P8 of handling robot 2 are indicated here schematically, with P8 (unbroken lines) denoting the position of handling robot 2 during the transfer/takeover of product units 6 from paternoster storage container 21 and P7 (dashed lines) denoting the position of handling robot 2 when product units 6 are transferred to second conveyor belt 4.

Figure 7:
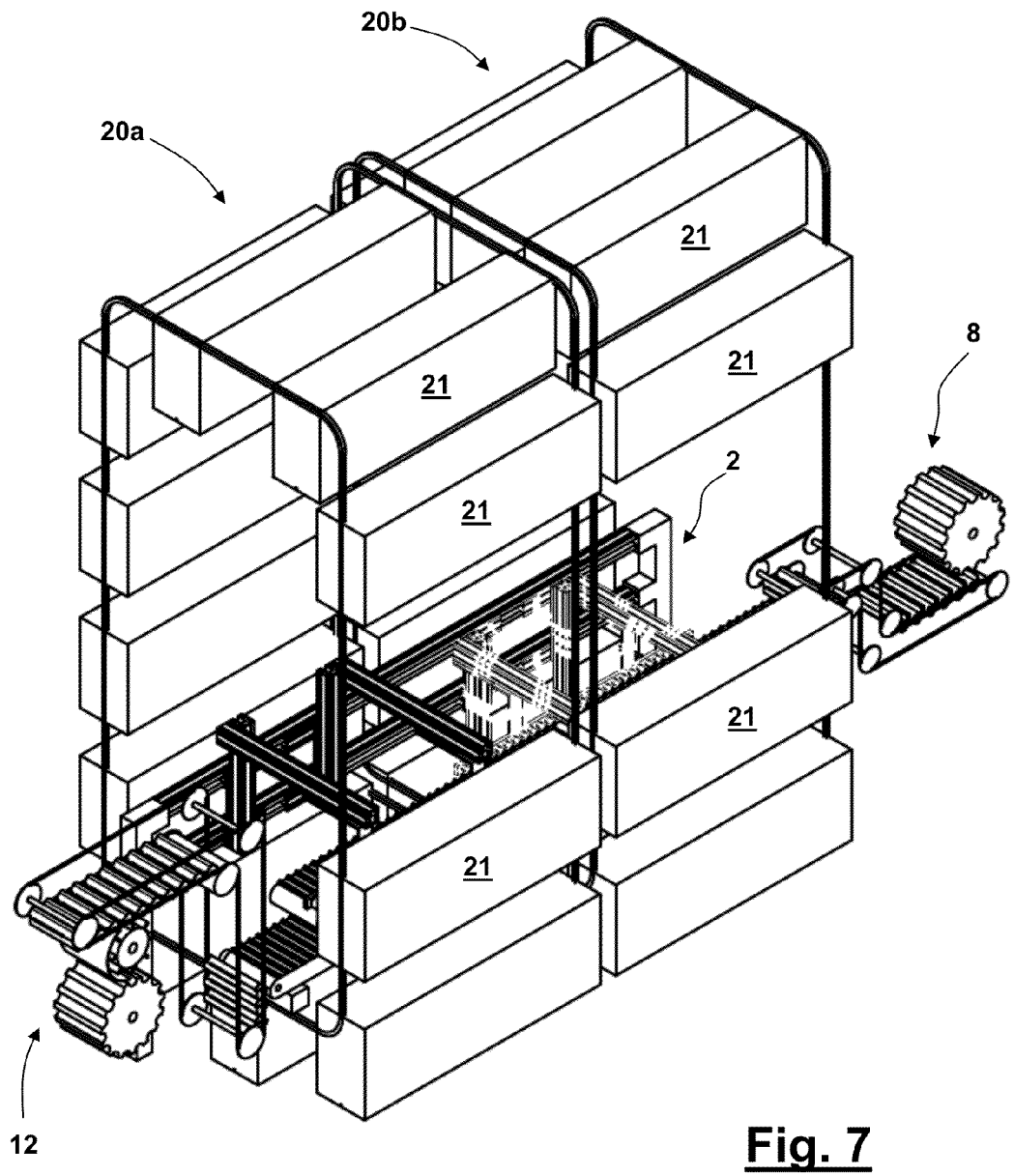
FIG. 7 shows a three-dimensional view of the intermediate storage device according to FIG. 3.

Finally, FIG. 7 shows a 3-dimensional view of the intermediate storage device according to FIG. 3. It can also clearly be seen here that handling robot 2 is located inside the paternoster loops. Conveyor unit 8 (input side) supplies product units to first conveyor belt 3, whilst a further conveyor unit 12 (output side) takes up product units from second conveyor belt 4.

The operational sequences with the use of a paternoster storage arrangement naturally have a very great similarity to the operational sequences with the use of a high-rack storage arrangement. Reference is therefore made to the parts of the description relating to this. An essential difference naturally consists in the fact that no swiveling movements are required in the case of the paternoster solution described by way of example. It should however be pointed out that a high-rack storage arrangement can obviously be disposed in a similar manner in relation to handling robot 2, so that no swiveling movements are required for the intermediate storage.

The control of the operational sequences and the control/regulation of the movements of handling robot 2 in the interaction with the controls of the intermediate storage arrangement, conveyor unit 8 and further conveyor unit 12 is in principle well known to the person skilled in the art and is not therefore the subject-matter of this description. The same of course also applies to the jointly incorporated sensor technology, with which, for example, the presence, instantaneous positioning and absence of gaps or incompleteness of product units 6 on the conveyor belts are detected and evaluated in order to guarantee the interaction of all the aforementioned devices and sequences in as trouble-free a manner as possible.

LIST OF REFERENCE NUMBERS

1 intermediate storage device
2 handling robot
3 first conveyor belt (supplying)
4 second conveyor belt (delivering)
5 high-rack storage arrangement
6 product unit
7 engaging device
8 conveyor unit
9 conveyor chain
10 conveyor gondolas
11 product receptacle
12 further conveyor unit
13 further conveyor chain
14 further conveyor gondola
15 storage container
16 engaging spike
17 drawer
20a, b paternoster units
21 paternoster storage containers
22 connection chain
23 guide
P1,6 pos. 1,6 of handling robot (take-over from 1st conveyor belt)
P2,7 pos. 2,7 of handling robot (transfer to 2nd conveyor belt)
P3 pos. 3 of handling robot (analogous to P1)
P4 pos. 4 of handling robot (analogous to P2)
P5,8 pos. 5,8 of handling robot (transfer/take-over of storage container)
S1 swiveling movement of handling robot
S2 swiveling movement of storage container
R direction of rotation (paternoster)

The invention claimed is:

1. A method for operating a device for taking over, temporarily storing and passing on elongated, hollow-cylindrical product units which come from a production line wherein the device comprises:

(i) a supplying conveyor arrangement in the form of a first conveyor belt;
(ii) a continuously delivering conveyor arrangement in the form of a second conveyor belt, the first conveyor belt and the second conveyor belt being disposed horizontally lying one above the other in a transfer zone;
(iii) an intermediate storage arrangement in the form of a high-rack storage arrangement or a paternoster storage arrangement disposed in the transfer zone; and
(iv) a handling robot disposed in a region of the transfer one between the supplying and delivering conveyor arrangements and the high-rack storage arrangement, the method comprising:

(a) adapting the position and speed of the handling robot to the first conveyor belt;
(b) employing the handling robot to take a number of product units from the first conveyor belt; and
(c) employing the handling robot to either:
(i) feed the product units removed from the first conveyor belt to the second conveyor belt after adaptation of the position and speed of the handling robot to the second conveyor belt, or
(ii) feed the product units removed from the first conveyor belt to the intermediate storage arrangement.

2. The method according to claim 1, wherein the handling robot, in the case of feeding product units from the first conveyor belt to the second conveyor belt, feeds the product units to the second conveyor belt in such a way that the product units are disposed gap-free on the second conveyor belt.

3. The method according to claim 1, wherein, in the case of feeding product units from the first conveyor belt to the second conveyor belt, only linear movements of the handling robot are performed.

4. The method according to claim 1, wherein, in the case of feeding product units from the first conveyor belt to the intermediate storage arrangement, only linear movements of the handling robot are performed.

5. The method according to claim 1, wherein the intermediate storage arrangement is a high-rack storage arrangement and, in the case of feeding product units from the first conveyor belt to the high-rack storage arrangement, a swiveling movement of the handling robot about an axis running parallel to the conveying direction of the first conveyor belt is performed separately from linear movements of the handling robot.

6. The method according to claim 1, wherein the intermediate storage arrangement is a paternoster storage arrangement and, in the case of feeding product units from the first conveyor belt to the paternoster storage arrangement, only linear movements of the handling robot are performed.

7. The method according to claim 6, wherein the paternoster storage arrangement comprises at least one independently moveable, paternoster units and a first control device for the at least one paternoster unit cooperates with a second control device for the handling robot, such that rapid taking-over, temporary storage and passing-on of product units can be performed whilst minimizing movement of the at least one paternoster unit.

8. The method according to claim 7, wherein empty and/or full paternoster storage containers of the at least one paternoster unit are continuously made available in the vicinity of the first conveyor belt and the second conveyor belt.

9. The method of claim 1, wherein the product units removed from the first conveyor belt are fed to the intermediate storage arrangement, and the method further comprises:

(a) employing the handling robot to remove the product units from the intermediate storage arrangement;
(b) adapting the position and speed of the handling robot to the second conveyor belt; and
(c) employing the handling robot to feed the product units to the second conveyor belt.

10. The method according to claim 9, wherein only linear movements of the handling robot are performed.

11. The method according to claim 9, wherein the intermediate storage arrangement is a high-rack storage arrangement and, when product units are fed from the high-rack storage arrangement to the second conveyor belt, a swiveling movement of the handling robot about an axis running parallel to the conveying direction of the second conveyor belt a performed separately from linear movements of the handling robot.

12. The method according to claim 9, wherein the intermediate storage arrangement is a paternoster storage arrangement and, when product units are fed from the paternoster storage arrangement to the second conveyor belt, only linear movements of the handling robot are performed.

13. The method according to claim 12, wherein the paternoster storage arrangement comprises at least one independently moveable, paternoster unit and a first control device for the at least one paternoster unit cooperates with a second control device for the handling robot, such that rapid taking-over, temporary storage and passing-on of product units can be performed whilst minimizing movement of the at least one paternoster unit.

14. The method according to claim 13, wherein empty and/or full paternoster storage containers of the at least one paternoster unit are continuously made available in the vicinity of the first conveyor belt and the second conveyor belt.

* * * * *

UNITED STATES PATENT AND TRADEMARK OFFICE
CERTIFICATE OF CORRECTION

| | | |
|---|---|---|
| PATENT NO. | : 8,590,690 B2 | Page 1 of 1 |
| APPLICATION NO. | : 12/628828 | |
| DATED | : November 26, 2013 | |
| INVENTOR(S) | : Gottlieb Benz and Albertus Robbertson | |

It is certified that error appears in the above-identified patent and that said Letters Patent is hereby corrected as shown below:

| Col. No. | Line(s) | Edits |
|---|---|---|
| Title Page | Item 73 | Replace "Assignees: Texal AG" with ---Assignees: Texa AG--- |
| In the Claims | | |
| 10 | 10 | Replace "the transfer one" with ---the transfer zone--- |

Signed and Sealed this
Eighteenth Day of February, 2014

Michelle K. Lee
*Deputy Director of the United States Patent and Trademark Office*